United States Patent
Eisenstein et al.

(10) Patent No.: US 11,727,464 B2
(45) Date of Patent: Aug. 15, 2023

(54) UTILIZING MACHINE LEARNING MODELS TO DETERMINE AND RECOMMEND NEW RELEASES FROM CLOUD PROVIDERS TO CUSTOMERS

(71) Applicant: Accenture Global Solutions Limited, Dublin (IE)

(72) Inventors: Michael Eisenstein, Seattle, WA (US); Debashis Bardhan, Bedford, MA (US)

(73) Assignee: Accenture Global Solutions Limited, Dublin (IE)

( * ) Notice: Subject to any disclaimer, the term of this patent is extended or adjusted under 35 U.S.C. 154(b) by 205 days.

(21) Appl. No.: 17/008,407

(22) Filed: Aug. 31, 2020

(65) Prior Publication Data

US 2022/0067747 A1 Mar. 3, 2022

(51) Int. Cl.
*G06Q 30/0201* (2023.01)
*G06Q 30/0204* (2023.01)
*G06Q 30/0601* (2023.01)
*G06Q 40/12* (2023.01)
*G06F 16/28* (2019.01)

(52) U.S. Cl.
CPC ....... *G06Q 30/0631* (2013.01); *G06F 16/285* (2019.01); *G06Q 30/0201* (2013.01); *G06Q 30/0204* (2013.01); *G06Q 40/12* (2013.12)

(58) Field of Classification Search
CPC .......... G06Q 30/0201; G06Q 30/0204; G06Q 30/0631
See application file for complete search history.

(56) References Cited

U.S. PATENT DOCUMENTS

| | | | | |
|---|---|---|---|---|
| 2014/0136275 A1* | 5/2014 | Rathmann | .......... | G06Q 10/0633 705/7.27 |
| 2014/0280946 A1* | 9/2014 | Mukherjee | .............. | H04L 67/51 709/226 |
| 2015/0341230 A1* | 11/2015 | Dave | .................. | H04L 41/0893 705/7.29 |
| 2015/0341240 A1* | 11/2015 | Iyoob | .................... | G06Q 40/00 709/201 |

(Continued)

FOREIGN PATENT DOCUMENTS

| CN | 110134330 A | 8/2019 |
|---|---|---|
| WO | 2019090153 A1 | 5/2019 |

*Primary Examiner* — Deirdre D Hatcher
(74) *Attorney, Agent, or Firm* — Harrity & Harrity, LLP

(57) ABSTRACT

In some implementations, a device may receive release data identifying new releases associated with cloud providers. The device may receive customer data associated with customers of the cloud providers. The device may receive interest data identifying interests of the customers. The device may filter the release data and may process the filtered release data and taxonomy data identifying historical release data, with a model, to generate classification data identifying classifications of the release data. The device may process the filtered release data, the classification data, and the customer data, with a model, to identify a set of release data that is relevant for each customer, and to generate sets of release data for the customers. The device may identify additional data of the filtered release data that is relevant for each of the customers. The device may supplement the sets of release data with the additional data.

20 Claims, 9 Drawing Sheets

(56) References Cited

U.S. PATENT DOCUMENTS

| | | | |
|---|---|---|---|
| 2016/0132806 A1* | 5/2016 | To | G06Q 10/06313 705/7.23 |
| 2017/0180487 A1* | 6/2017 | Frank | G06F 11/3688 |
| 2018/0124189 A1* | 5/2018 | Edgington | H04L 41/5096 |
| 2018/0131574 A1* | 5/2018 | Jacobs | H04L 43/0817 |
| 2018/0302303 A1* | 10/2018 | Skovron | G06F 11/0709 |
| 2019/0081787 A1 | 3/2019 | Bayar et al. | |
| 2020/0034795 A1* | 1/2020 | Li | G06Q 10/1053 |
| 2022/0092668 A1* | 3/2022 | Lu | G06N 5/04 |

* cited by examiner

UTILIZING MACHINE LEARNING MODELS TO DETERMINE AND RECOMMEND NEW RELEASES FROM CLOUD PROVIDERS TO CUSTOMERS

BACKGROUND

A technology provider, such as a cloud provider, provides services, computing resources, and/or the like to customers of the technology provider. The technology provider may release a new service, technology, feature, regional access, and/or an economic model that may be subscribed to by the customers of the technology provider.

SUMMARY

In some implementations, a method includes receiving, by a device, release data associated with cloud providers. The release data may include information identifying new releases of services, technologies, features, regional access, and/or pricing models associated with the cloud providers, removal of a service, a technology, a feature, regional access, and/or a pricing model by the cloud providers, an end of life of a service, a technology, a feature, regional access, and/or a pricing model associated with the cloud providers, an end of support of a service, a technology, a feature, regional access, and/or a pricing model associated with the cloud providers, and/or the like. The method may further include receiving, by the device, customer data identifying usage, inventory, and billing associated with customers of the cloud providers; receiving, by the device, interest data identifying interests of the customers with respect to the cloud providers; filtering, by the device and based on one or more filters, the release data to generate filtered release data; processing, by the device, the filtered release data and taxonomy data identifying historical release data, with a classifier model, to generate classification data identifying classifications of the filtered release data; processing, by the device, the filtered release data, the classification data, and the customer data, with a matching model, to identify a set of the filtered release data that is relevant for each of the customers, and to generate sets of the filtered release data for the customers; processing, by the device, the filtered release data, the classification data, and the interest data, with the matching model, to identify additional data of the filtered release data that is relevant for each of the customers; supplementing, by the device, the sets of filtered release data with the additional data of the filtered release data to generate supplemented sets of the filtered release data for the customers; and performing, by the device, one or more actions based on the supplemented sets of filtered release data.

In some implementations, a device includes one or more memories, and one or more processors communicatively coupled to the one or more memories, configured to receive release data associated with cloud providers. The release data may include information identifying new releases of services, technologies, features, regional access, and pricing models associated with the cloud providers, removal of a service, a technology, a feature, regional access, and/or a pricing model by the cloud providers, an end of life of a service, a technology, a feature, regional access, and/or a pricing model associated with the cloud providers, an end of support of a service, a technology, a feature, regional access, and/or a pricing model associated with the cloud providers, and/or the like. The one or more processors may be further configured to receive customer data identifying usage, inventory, and billing associated with customers of the cloud providers; receive interest data identifying interests of the customers with respect to the cloud providers; filter, based on one or more filters, the release data to generate filtered release data; process the filtered release data and taxonomy data identifying historical release data, with a first model, to generate classification data identifying classifications of the filtered release data; process the filtered release data, the classification data, and the customer data, with a second model, to identify a set of the filtered release data that is relevant for each of the customers, and to generate sets of the filtered release data for the customers; process the filtered release data, the classification data, and the interest data, with the second model, to identify additional data of the filtered release data that is relevant for each of the customers; supplement the sets of filtered release data with the additional data of the filtered release data to generate supplemented sets of the filtered release data for the customers; and perform one or more actions based on the supplemented sets of filtered release data.

In some implementations, a non-transitory computer-readable medium storing a set of instructions includes one or more instructions that, when executed by one or more processors of a device, cause the device to receive release data associated with cloud providers. The release data may include information identifying new releases of services, technologies, features, regional access, and pricing models associated with the cloud providers, removal of a service, a technology, a feature, regional access, and/or a pricing model by the cloud providers, an end of life of a service, a technology, a feature, regional access, and/or a pricing model associated with the cloud providers, an end of support of a service, a technology, a feature, regional access, and/or a pricing model associated with the cloud providers, and/or the like. The one or more instructions, when executed by the one or more processors, may further cause the device to receive customer data identifying usage, inventory, and billing associated with customers of the cloud providers; receive interest data identifying interests of the customers with respect to the cloud providers; filter, based on one or more filters, the release data to generate filtered release data; process the filtered release data and taxonomy data identifying historical release data, with a classifier model, to generate classification data identifying classifications of the filtered release data; process the filtered release data, the classification data, and the customer data, with a matching model, to identify a set of the filtered release data that is relevant for each of the customers, and to generate sets of the filtered release data for the customers; process the filtered release data, the classification data, and the interest data, with the matching model, to identify additional data of the filtered release data that is relevant for each of the customers; supplement the sets of filtered release data with the additional data of the filtered release data to generate supplemented sets of the filtered release data for the customers; and provide the supplemented sets of the filtered release data to server devices associated with the customers.

DETAILED DESCRIPTION

Figure 1A:
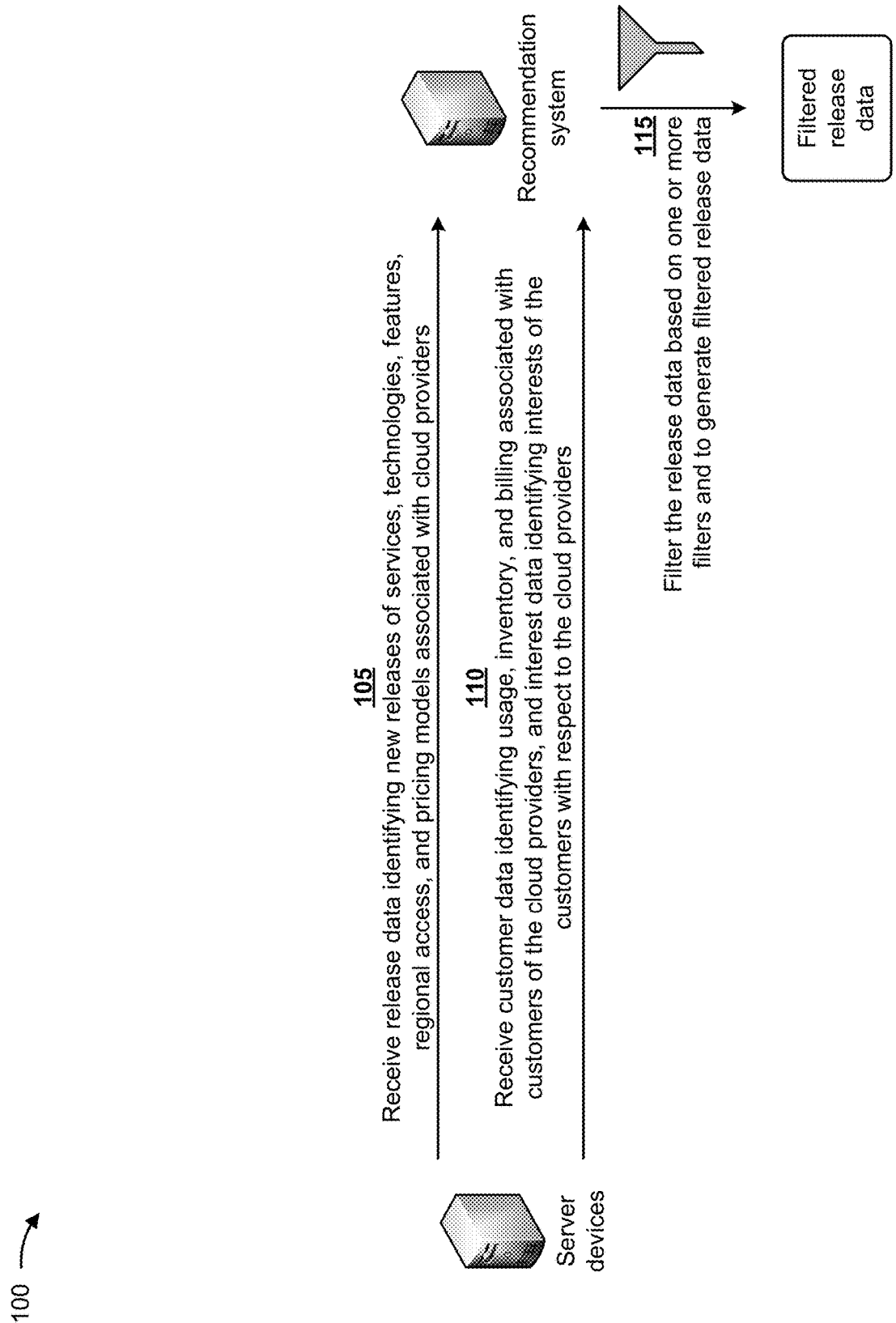
FIGS. 1A-1E are diagrams of an example implementation described herein.

The following detailed description of example implementations refers to the accompanying drawings. The same reference numbers in different drawings may identify the same or similar elements.

Technology providers, such as hyperscale cloud providers, are releasing, removing, withdrawing, modifying, ending service for, and/or the like new services, technologies, features, regional access, and economic models at speeds that exceed an enterprise customer's ability to adapt and/or adopt the new releases. Further, a customer of a cloud provider lacks a unified view of new releases related to a service utilized by the customer, relevant to a business of the customer, and/or the like. For example, a customer may obtain information identifying a set of new releases by a cloud provider and may manually review the information to determine whether to adapt and/or adopt any of the new releases being offered by the cloud provider. In some cases, the quantity of new releases being offered by the cloud provider may make it difficult for the customer to identify a new release that would be useful to the customer. Thus, current techniques for determining whether to adapt and/or adopt a new release offered by a cloud provider waste human resources, computing resources (e.g., processing resources, memory resources, communication resources, and/or the like), and/or the like associated with manually obtaining and reviewing information identifying new releases offered by a cloud provider, failing to adopt a new release based on incorrectly reviewing the information identifying the new releases (e.g., failing to identify a new release as being useful and/or relevant to the customer), and/or the like.

Some implementations described herein relate to a recommendation system that determines new releases from cloud providers and provides recommendations regarding the new releases to customers. For example, the recommendation system may obtain customer data identifying usage, inventory, and billing associated with customers of the cloud providers. The recommendation system may receive interest data identifying interests of the customers with respect to the cloud providers. The recommendation system may filter, based on one or more filters, the release data to generate filtered release data. The recommendation system may process the filtered release data and taxonomy data identifying historical release data, with a classifier model, to generate classification data identifying classifications of the filtered release data. The recommendation system may process the filtered release data, the classification data, and the customer data, with a matching model, to identify a set of the filtered release data that is relevant for each of the customers, and to generate sets of the filtered release data for the customers. The recommendation system may process the filtered release data, the classification data, and the interest data, with the matching model, to identify additional data of the filtered release data that is relevant for each of the customers. The recommendation system may supplement the sets of filtered release data with the additional data of the filtered release data to generate supplemented sets of the filtered release data for the customers. The recommendation system may provide a recommendation to a customer based on the supplemented sets of the filtered release data.

In this way, the recommendation system utilizes machine learning models to determine recommendations associated with new releases by cloud service providers for customers. The recommendations may enable customers to adopt new releases that are designed to increase performance of services utilized by the customers, lower one or more costs associated with utilizing services provided by the cloud provider, improve security (e.g., by ensuring customers have the latest version of software, access to new security technologies, and/or the like), improve availability of the new releases, and/or the like.

Further, by providing the recommendations to the customers, the recommendation system provides the customers with a unified view of new releases related to a service utilized by the customers, new releases relevant to a business of the customers, new releases available in an area that a customer does not have services or a business, and/or the like. Thus, the recommendation system may conserve human resources, computing resources (e.g., processing resources, memory resources, communication resources, and/or the like), and/or the like that would otherwise be wasted by manually obtaining and reviewing information identifying new releases offered by a cloud provider, failing to adopt a new release based on incorrectly reviewing the information identifying the new releases (e.g., failing to identify a new release as being useful and/or relevant to the customer), and/or the like.

FIGS. 1A-1E are diagrams of one or more example implementations 100 described herein. As shown in FIG. 1A, server devices may be associated with a recommendation system. The server devices may include server devices associated with entities that provide cloud computing environments to customers of the entities (e.g., cloud providers), servers associated with entities that generate, collect, and/or provide customer data identifying usage, inventory, and billing associated with customers of the cloud providers, servers associated with entities that generate, collect, and/or provide interest data identifying interests of the customers with respect to the cloud providers, and/or the like. The recommendation system may include one or more devices that utilize machine learning models to determine and recommend new releases from cloud providers to customers, as described herein.

As also shown in FIG. 1A, and by reference number 105, the recommendation system receives, from the server devices, release data identifying new releases of services, technologies, features, regional access, and pricing models associated with cloud providers. Additionally, the release data may include information identifying a new release as a new service, technology, feature, and/or the like; information identifying a new release as an enhancement to an existing service, technology, feature, and/or the like; information identifying a geographical area associated with the new release (e.g., information indicating that the new release is available to customers located in a particular region), information identifying a classification associated with a new release (e.g., network security, pricing and commercial model, billing, and/or the like); information identifying a new release as a new pricing model; information identifying removal of a service, a technology, a feature, regional access, and/or a pricing model by the cloud providers; information identifying an end of life of a service, a technology, a feature, regional access, and/or a pricing model associated with the cloud providers; information identifying an end of support of a service, a technology, a feature, regional access, and/or a pricing model associated with the cloud providers; and/or the like.

In some implementations, the recommendation system requests the release data from the server devices. In some implementations, the recommendation system obtains the release data from one or more web pages that include information identifying new releases associated with a cloud provider. Alternatively, and/or additionally, the recommendation system may obtain the release data from a Really Simple Syndication (RSS) feed, a blog, an online version of an industry publication, and/or the like.

In some implementations, the recommendation system periodically obtains the release data. For example, the recommendation system may obtain the release data daily, weekly, monthly, and/or the like. Alternatively, and/or additionally, the recommendation system may obtain the release data based on an occurrence of an event. For example, the recommendation system may obtain the release data based on receiving a request from a customer of a cloud provider, based on determining that a cloud provider published information identifying a set of new releases, and/or the like.

As shown by reference number 110, the recommendation system receives customer data identifying usage, inventory, and billing associated with customers of the cloud providers, and interest data identifying interests of the customers with respect to the cloud providers. For example, the recommendation system may receive the customer data and/or the interest data from a server device associated with the recommendation system.

As an example, a customer may register for a service to receive recommendations regarding new releases by a cloud provider. As part of a process for registering for the service, the customer may provide information identifying customer data and/or interest data associated with the customer. For example, the customer may provide a billing statement received from a cloud provider, the customer may input customer data and/or interest data via a user interface in response to a series of queries provided to the customer during the registration process, and/or the like. The customer data and/or the interest data may be stored in a memory of a server device associated with the recommendation system. The recommendation system may obtain the customer data and/or the interest data from the server device.

In some implementations, the recommendation system periodically obtains the customer data and/or the interest data. For example, the recommendation system may automatically obtain the customer data and/or the interest data every hour, daily, weekly, monthly, and/or the like. Alternatively, and/or additionally, the recommendation system may receive the customer data and/or the interest data based on an occurrence of an event. For example, the server device may provide the customer data and/or the interest data to the recommendation system based on receiving new customer data and/or interest data (e.g., from a device associated with a customer), based on a portion of the customer data and/or the interest data being modified, based on a portion of the customer data and/or the interest data being deleted, and/or the like.

As shown by reference number 115, the recommendation system filters the release data based on one or more filters and to generate filtered release data. The recommendation system may filter the release data to improve scale, reduce noise, target relevant information, and/or the like. For example, the recommendation system may filter the release data to remove features relating to correcting a defect, information identifying pre-release features, information identifying features to be released at a later date, and/or the like.

In some implementations, the recommendation system processes the release data and filters the processed release data. In some implementations, the recommendation system processes the release data based on a natural language processing (NLP) technique. For example, the recommendation system may convert text to lowercase, remove punctuation, remove stop words, strip white space, perform stemming, perform lemmatization, spell out abbreviations and acronyms, and/or the like. In some implementations, the recommendation system may remove sparse words, such as words that are uncommon (e.g., according to a domain-specific corpus, and/or the like).

In some implementations, the recommendation system may execute a first NLP technique for analyzing unstructured documents. For example, the recommendation system may analyze unstructured release data using a token-based NLP technique (e.g., a technique using regular expressions), a category-based NLP technique (e.g., a named entity recognition (NER) technique), an approximation-based NLP technique (e.g., a fuzzy text search technique), and/or the like. Additionally, or alternatively, the recommendation system may analyze structured release data using a second NLP technique (e.g., a metadata-based NLP technique and/or a similar type of technique).

In some implementations, the recommendation system may execute a token-based NLP technique, such as a technique using regular expressions, to identify the features. For example, the recommendation system may reference a data structure that stores regular expressions that may be used to identify a feature associated with customer data (e.g., a new service, a feature update, a beta release, and/or the like). The recommendation system may use the regular expressions to identify the feature based on comparing the regular expressions and information included in the release data.

Additionally, or alternatively, the recommendation system may execute an approximation-based NLP technique, such as a fuzzy text search technique, to identify the features. For example, the recommendation system may execute an approximation-based NLP technique to identify data that satisfies a threshold level of similarity with data stored in a data structure. In this case, the recommendation system may set a threshold level of similarity (e.g., a percentage, a number of characters, and/or the like), and may compare information included in the release data to information stored in the data structure. If the recommendation system determines that the threshold level of similarity is satisfied, the recommendation system may identify the information as information identifying the feature.

In some implementations, the recommendation system may use multiple NLP techniques, and may filter outputs of the multiple NLP techniques into the set of values identifying the features. For example, the recommendation system may identify a first set of values using a first one or more NLP techniques. Additionally, the recommendation system may identify a second set of values using a second one or more NLP techniques. In some implementations, a mixture of overlapping values and conflicting values may occur. In these implementations, the recommendation system may address the conflicting values by filtering the first set of values and the second set of values into a third set of values that excludes duplicate values, excludes conflicting values (e.g., by selecting one value, of two conflicting values, using a rule, such a threshold) and/or the like. The recommendation system may use the third set of values as the set of values identifying the features.

In some implementations, the recommendation system may execute one or more of the above-mentioned NLP techniques on a particular type of release data, on release data associated with a particular cloud provider, on a particular field or group of fields within the release data, and/or the like. Additionally, or alternatively, the recommendation system may take an average, or a weighted average, of the outputs of the one or more NLP techniques being deployed to identify the features. As an example, the recommendation system may assign a weight to an output associated with each additional NLP technique and may take an average or a weighted average to identify the features.

The identified features indicate a service or application to which a new release applies, a geographic region associated with the new release, whether the new release is associated with a new or existing service, technology, application and/or the like, a cloud provider associated with the new release, a cost associated with the new release, a cost model associated with a new release, a date on which the new release was released, and/or the like. Alternatively, and/or additionally, the identified features may indicate a removal of a service, a technology, a feature, regional access, and/or a pricing model by the cloud providers; an end of life of a service, a technology, a feature, regional access, and/or a pricing model associated with the cloud providers; an end of support of a service, a technology, a feature, regional access, and/or a pricing model associated with the cloud providers; and/or the like. The above-listed features are intended to be merely examples of types of features that may be identified. In practice, the features may include any one or more of the above-listed features and/or one or more other types of features not listed above. The recommendation system may filter the release data based on the identified features to generate the filtered release data.

Figure 1B:
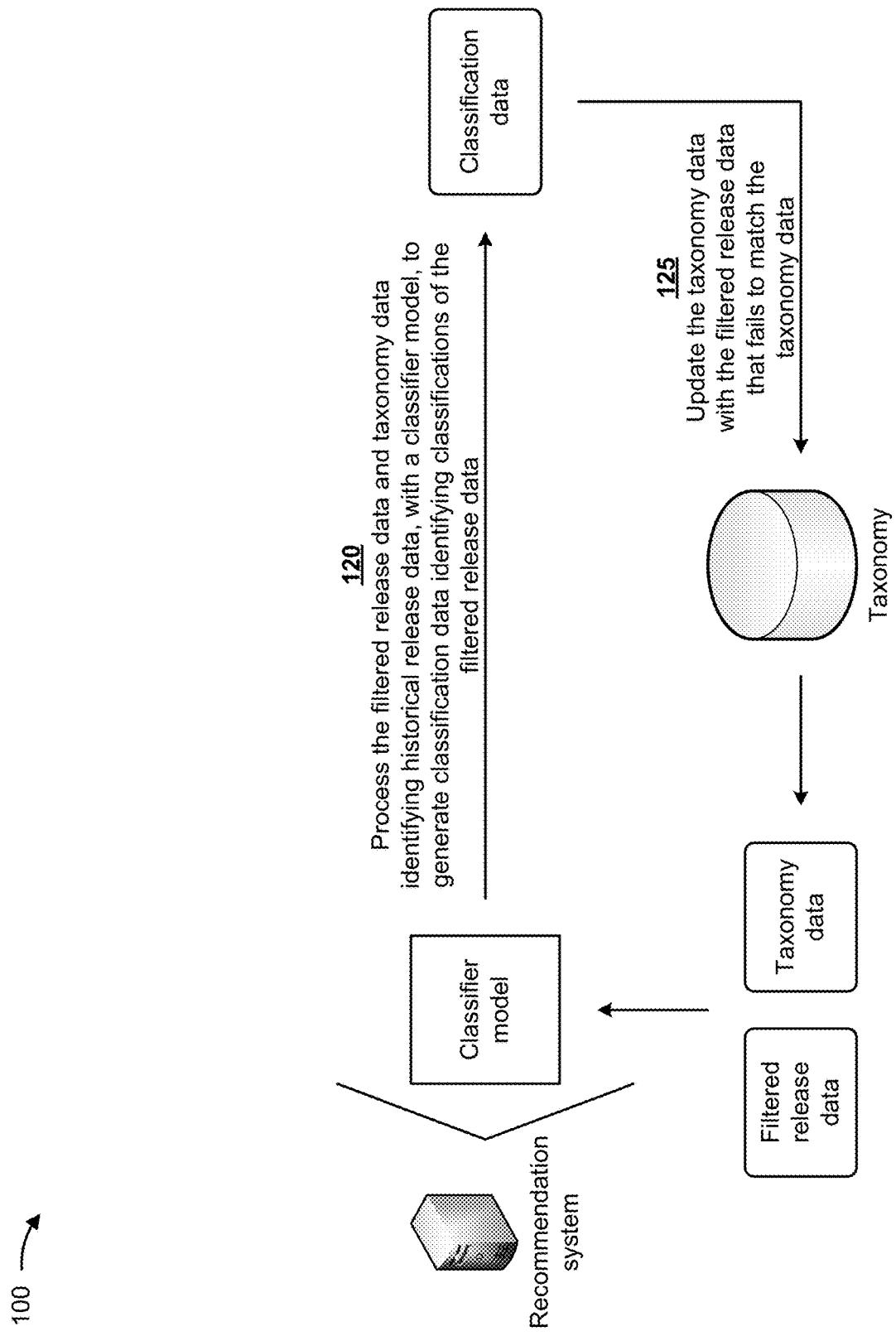

As shown in FIG. 1B, and by reference number 120, the recommendation system processes the filtered release data and taxonomy data identifying historical release data, with a classifier model, to generate classification data identifying classifications of the filtered release data. The recommendation system may utilize NLP to analyze the filtered release data to extract categories of the filtered release data. In some implementations, the categories of the filtered release data may correspond to the features identified based on performing one or more NLP techniques.

The recommendation system may match categories of the filtered release data and the taxonomy data to identify the classifications of the filtered release data. The classifications may include a new feature classification, a new service classification, a new technology classification, an upgrade to an existing feature classification, an upgrade to an existing service classification, an upgrade to an existing technology classification, a classification associated with a geographical area (e.g., a city, a region, a state, and/or the like), a new pricing model classification, an update to an existing pricing model classification, a removal of an existing feature classification, a removal of an existing service classification, a removal of an existing technology classification, an end of life classification, an end of service classification, and/or the like. The above-listed classifications are intended to be merely examples of types of classifications that may be identified. In practice, the classifications may include any one or more of the above-listed classifications and/or one or more other types of classifications not listed above.

In some implementations, the historical release data may include information identifying features associated with a previous new release (e.g., a historical release) offered by a cloud provider and information associating the features with one or more classifications. The recommendation system may determine a feature associated with a new release identified in the release data. The recommendation system may determine a similarity score between the feature and a feature included in the historical release data (e.g., a historical feature). The similarity score may represent a degree of similarity between the new release and the historical feature. The recommendation system may determine that the feature is associated with a classification associated with the historical feature based on the similarity score satisfying a threshold score.

In some implementations, the recommendation system may train the classification model to generate the classification data. The classification model may be trained based on historical data relating to new releases and historical data relating to classifications with which those new releases are associated. The classification model may be trained to determine, based on information regarding a new release, a classification with which the new release is associated and a confidence score that reflects a measure of confidence that the classification is accurate for this new release. In some implementations, the recommendation system trains the classification model in a manner similar to that described below with respect to FIG. 2. Alternatively, and/or additionally, the recommendation system may obtain a trained classification model from another device.

As shown by reference number 125, the recommendation system updates the taxonomy data with the filtered release data that fails to match the taxonomy data. In some implementations, the recommendation system may determine that the similarity scores between a particular feature and the historical features included in the historical release data fail to satisfy the threshold score. The recommendation system may determine that the particular feature does not match the taxonomy data based on the similarity scores failing to satisfy the threshold score. The recommendation system may update the taxonomy data to include the particular feature based on determining that the feature does not match the taxonomy data.

In some implementations, the recommendation system associates the particular feature with a new classification. As an example, the particular feature may be a new service not previously offered by a cloud provider. The recommendation system may associate the particular feature with a classification corresponding to the new service.

In some implementations, the recommendation system associates the particular feature with a known classification. For example, the recommendation system may associate the particular feature with a classification associated with a particular historical feature based on the similarity score determined for the particular feature being the highest similarity score relative to the similar scores determined for other historical features.

Figure 1C:
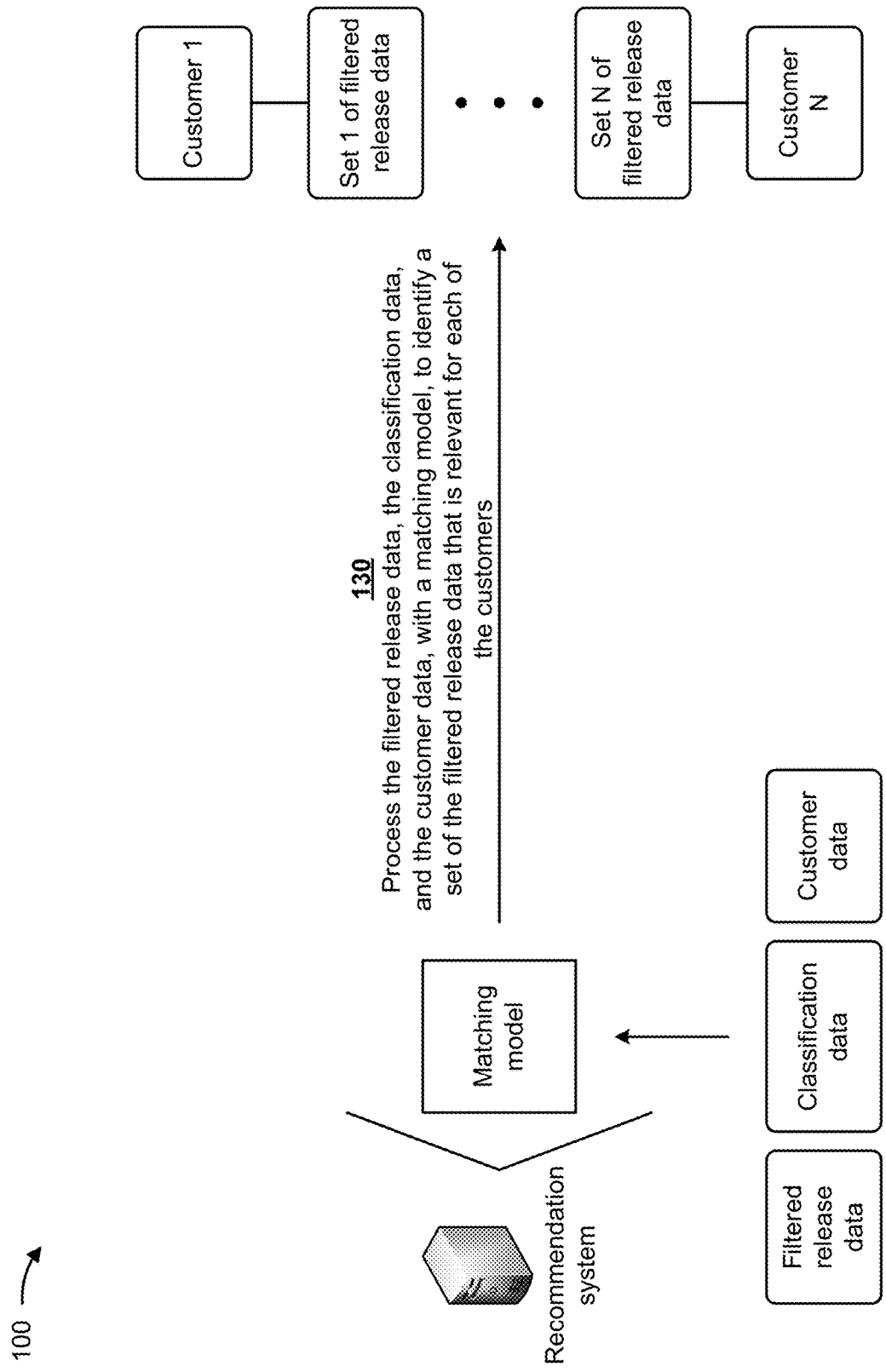

As shown in FIG. 1C, and by reference number 130, the recommendation system processes the filtered release data, the classification data, and the customer data, with a matching model, to identify a set of the filtered release data that is relevant for each of the customers.

The recommendation system may utilize one or more matching algorithms (e.g., a taxonomy string matching algorithm, a heuristics algorithm, a collaborative filtering algorithm, a hierarchical clustering algorithm, and/or the like) to identify a customer that may be interested in a new release. As an example, the recommendation system may determine that a new release is associated with a new sub-feature added to an existing feature provided by a particular cloud provider based on the classification data. The recommendation system may identify a customer that utilizes the existing feature provided by the particular cloud provider based on billing data associated with the customer and included in the customer data. The recommendation system may determine that the new sub-feature is relevant to the customer based on the customer utilizing the existing feature provided by the particular cloud provider.

In some implementations, the recommendation system identifies the set of the filtered release data based on the interest data associated with the customer. The interest data may indicate that the customer is interested in a particular type of service not currently provided by a cloud provider, not currently offered in a geographical area in which the customer is located, that a service utilized by the customer lacks certain features and/or capabilities, that the customer is not interested in a service that does not include a particular feature and/or capability, that the customer is not interested in a service that does include a particular feature and/or capability, and/or the like. The recommendation system may determine that a new release corresponds to the particular type of service based on the classification data. For example, the new feature may be associated with a classification corresponding to the new type of service, a classification indicating that the new feature is a new service, a classification indicating that the new feature is associated with the geographical area in which the customer is located, and/or the like. The recommendation system may determine that the new feature is relevant to the customer based on the new feature being associated with the classification corresponding to the new type of service, the classification indicating that the new feature is a new service, the classification indicating that the new feature is associated with the geographical area in which the customer is located, the new release including a feature and/or a capability needed by the customer, and/or the like.

In some implementations, the recommendation system identifies the set of the filtered release data based on a similarity between a new feature and an existing feature associated with the customer. As an example, the recommendation system may identify an existing service utilized by a customer based on the customer data. The recommendation system may determine a cost associated with the customer utilizing the existing service based on the customer data. The recommendation system may determine that the new feature is associated with a service that is similar to the existing service and/or that a cost of the service associated with the new feature is advantageous to a cost associated with existing service based on the classification data. The recommendation system may determine that the cost of the service associated with the new feature is advantageous to the cost associated with the existing service based on the cost of the service associated with the new feature being less than the cost associated with the existing service, a benefit to the customer (e.g., a performance improvement, a service improvement, and/or the like) is greater than, outweighs, justifies, and/or the like the cost of the service associated with the new feature being greater than the cost associated with the existing service, and/or the like. The recommendation system may determine that the new feature is relevant to the customer based on the service associated with the new feature being similar to the existing service and/or based on the cost of service associated with the new feature being advantageous to the cost of the existing service.

In some implementations, the recommendation system may rank the filtered release data based on one or more of the usage, the inventory, or the billing associated with the customer and based on the classification data, and may generate the sets of the filtered release data based on ranking the filtered release data. In some implementations, the recommendation system may determine impacts of the filtered release data on the customers. The recommendation system may rank the filtered release data based on the impacts and based on the classification data. The recommendation system may generate the sets of the filtered release data based on ranking the filtered release data.

In some implementations, the recommendation system may match the filtered release data and the interests of the customers in services associated with the cloud providers, technologies associated with the cloud providers, features associated with the cloud providers, regional access associated with the cloud providers, pricing models associated with the cloud providers, and/or the like based on the classification data. The recommendation system may identify the additional data of the filtered release data that is relevant for each of the customers based on matching the filtered release data and the interests of each of the customers.

In some implementations, the recommendation system may train the matching model to identify a set of filtered release data that is relevant for each of the customers. The matching model may be trained based on historical data relating to historical new releases, historical data relating to classifications with which those new releases are associated, and historical customer data. The matching model may be trained to determine, based on customer data, a new release that is relevant to the customer and a confidence score that reflects a measure of confidence that the determination is accurate for this new release. In some implementations, the recommendation system trains the matching model in a manner similar to that described below with respect to FIG. 2. Alternatively, and/or additionally, the recommendation system may obtain a trained matching model from another device.

Figure 1D:
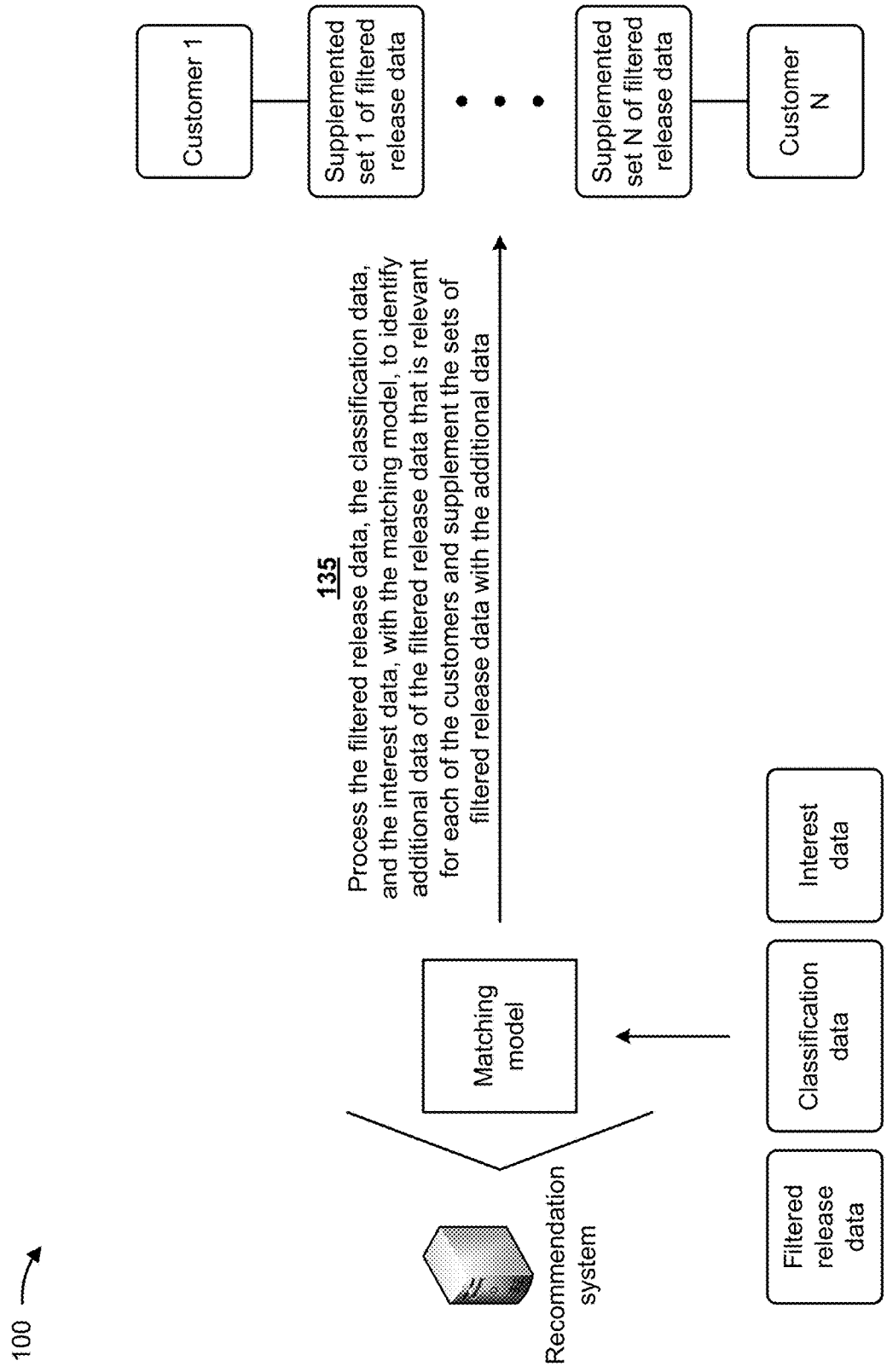

As shown in FIG. 1D, and by reference number 135, the recommendation system processes the filtered release data, the classification data, and the interest data, with the matching model, to identify additional data of the filtered release data that is relevant for each of the customers and supplements the sets of filtered release data with the additional data. The recommendation system may process the filtered release data, the classification data, and the interest data, with the matching model, to identify the additional data of the filtered release data in a manner similar to that described above with respect to FIG. 1C. The recommendation system may supplement a set of filtered release data for a particular customer with additional data of the filtered release data based on determining that the additional data is relevant to the particular customer.

Figure 1E:
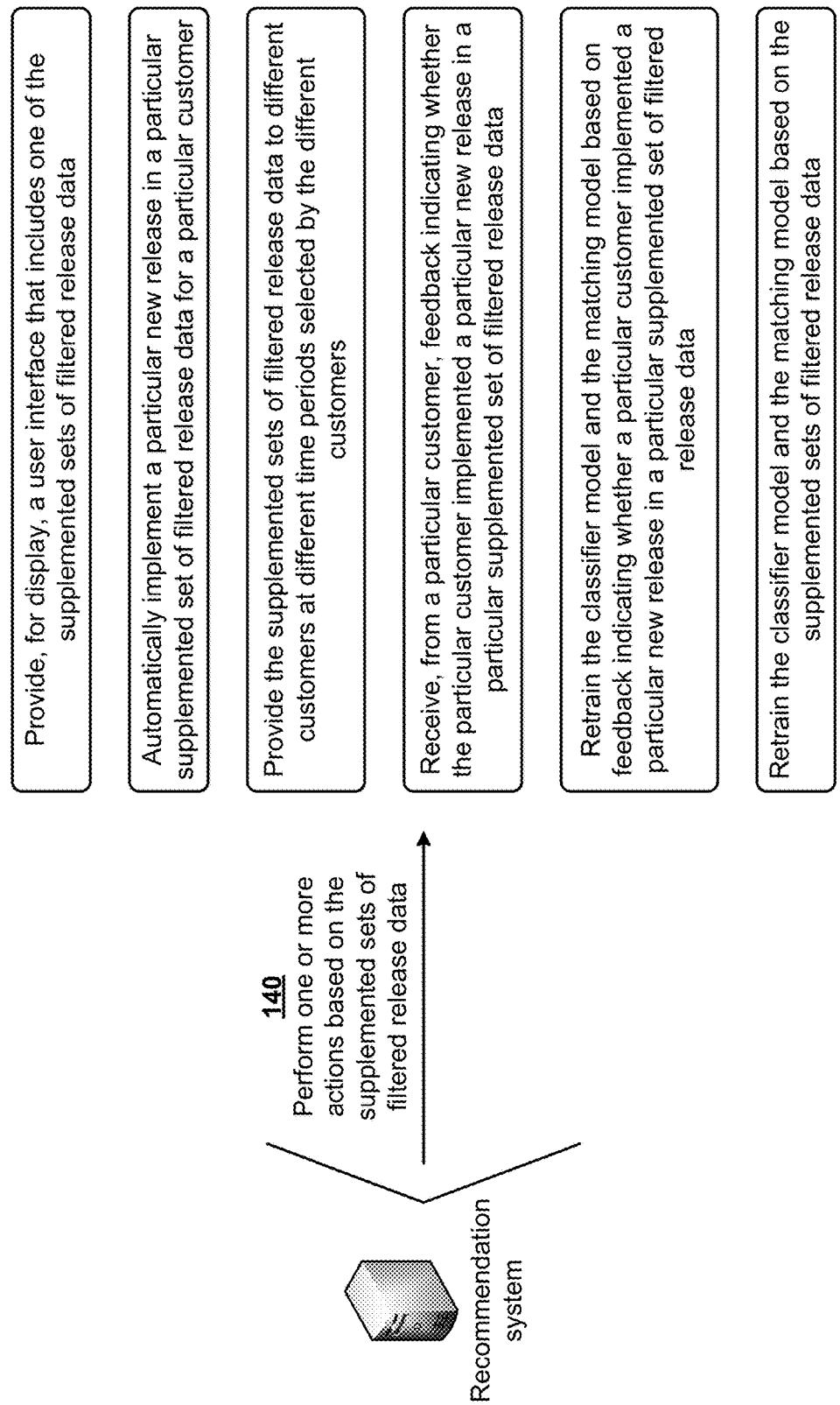

As shown in FIG. 1E, and by reference number 140, the recommendation system performs one or more actions based on the supplemented sets of filtered release data. In some implementations, the one or more actions include providing, for display, a user interface that includes one of the supplemented sets of filtered release data. For example, a user may utilize a client device to access the recommendation system. The recommendation system may provide a user interface that includes one of the supplemented sets of filtered release data to the client device to cause the client device to display the user interface, including the one of the supplemented sets of filtered release data, for display to the user based on the user accessing the recommendation system.

In some implementations, the one or more actions include automatically implementing a particular new release in a particular set of filtered release data for a particular customer. In some implementations, the recommendation system may automatically implement the particular new release based on customer preference data included in the customer data. For example, the customer preference data may include information indicating that the recommendation system is to automatically implement new releases associated with a particular service, a particular capability, a particular technology, a particular taxonomy classification (e.g., new releases associated with a security enhancement classification), and/or the like. The recommendation system may determine that the particular new release is associated with the particular service, the particular taxonomy classification, the particular capability, the particular technology, and/or the like based on the classification data associated with the particular new release. The recommendation system may automatically implement the particular new release based on the customer preference data including information indicating that the recommendation system is to automatically implement new releases associated with the particular service, the particular capability, the particular technology, the particular taxonomy classification, and/or the like and based on the particular new release being associated with the particular service, the particular capability, the particular technology, the particular taxonomy classification, and/or the like.

In some implementations, the one or more actions include providing the supplemented sets of filtered release data to different customers at different time periods selected by the different customers. For example, the recommendation system may provide the supplemented sets of filtered release data to different customers based on different time periods selected by the different customers and identified in customer data associated with the different customers.

In some implementations, the one or more actions include receiving, from a particular customer, feedback indicating whether the particular customer implemented a particular new release in a particular supplemented set of filtered release data. The recommendation system may receive the feedback and may update customer data and/or interest data associated with the particular customer based on the feedback. In some implementations, the feedback indicates that the particular customer implemented the particular new release. In these implementations, the recommendation system may update the customer data associated with the particular customer to indicate that the particular customer implemented the particular new release, a cost associated with the new release, a cloud provider associated with the new release, and/or the like. The recommendation system may update the interest data associated with the particular customer to indicate that the particular customer is interested in new releases associated with the particular new release, that the particular customer is no longer interested in obtaining a service associated with the particular new release (e.g., because the particular customer implemented the particular new release), and/or the like.

In some implementations, the feedback indicates that the particular customer did not implement the particular release. In these implementations, the recommendation system may update the interest data based on the particular customer not implementing the particular new release. For example, the recommendation system may update the interest data to indicate that the particular customer is not interested in a service associated with the particular new release, to indicate that a cost associated with the particular new release is too high, to modify a filter based on the cost associated with the particular new release, to indicate the cost associated with the new release, to indicate that the particular customer is not interested in new releases that include, or do not include, a particular feature, and/or the like.

In some implementations, the one or more actions include retraining the classifier model and the matching model based on feedback indicating whether a particular customer implemented a particular new release in a particular supplemented set of filtered release data and/or based on the supplemented sets of filtered release data. The recommendation system may modify a set of training data to include the supplemented sets of filtered release data and information indicating whether a particular customer implemented a particular new release in a particular supplemented set of filtered release data, thereby increasing an amount of training data available for training the classifier model and the matching model. Increasing the amount of training data may improve an accuracy of the classifier model and the matching model associated with classifying release data and/or determining the supplemented sets of filtered release data.

Accordingly, the recommendation system may conserve computing resources associated with identifying, obtaining, and/or generating actual historical data to train the classification model and the matching model. Further, by improving the accuracy of the classification model and the matching model, the recommendation system may conserve human resources, time, and/or computing resources associated with inaccurately classifying release data, inaccurately determining supplemented sets of filtered release data, providing supplemented sets of filtered release data that are not relevant to a customer to a customer, performing a corrective action associated with an inaccurately determined new release that was automatically implemented by the recommendation system, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
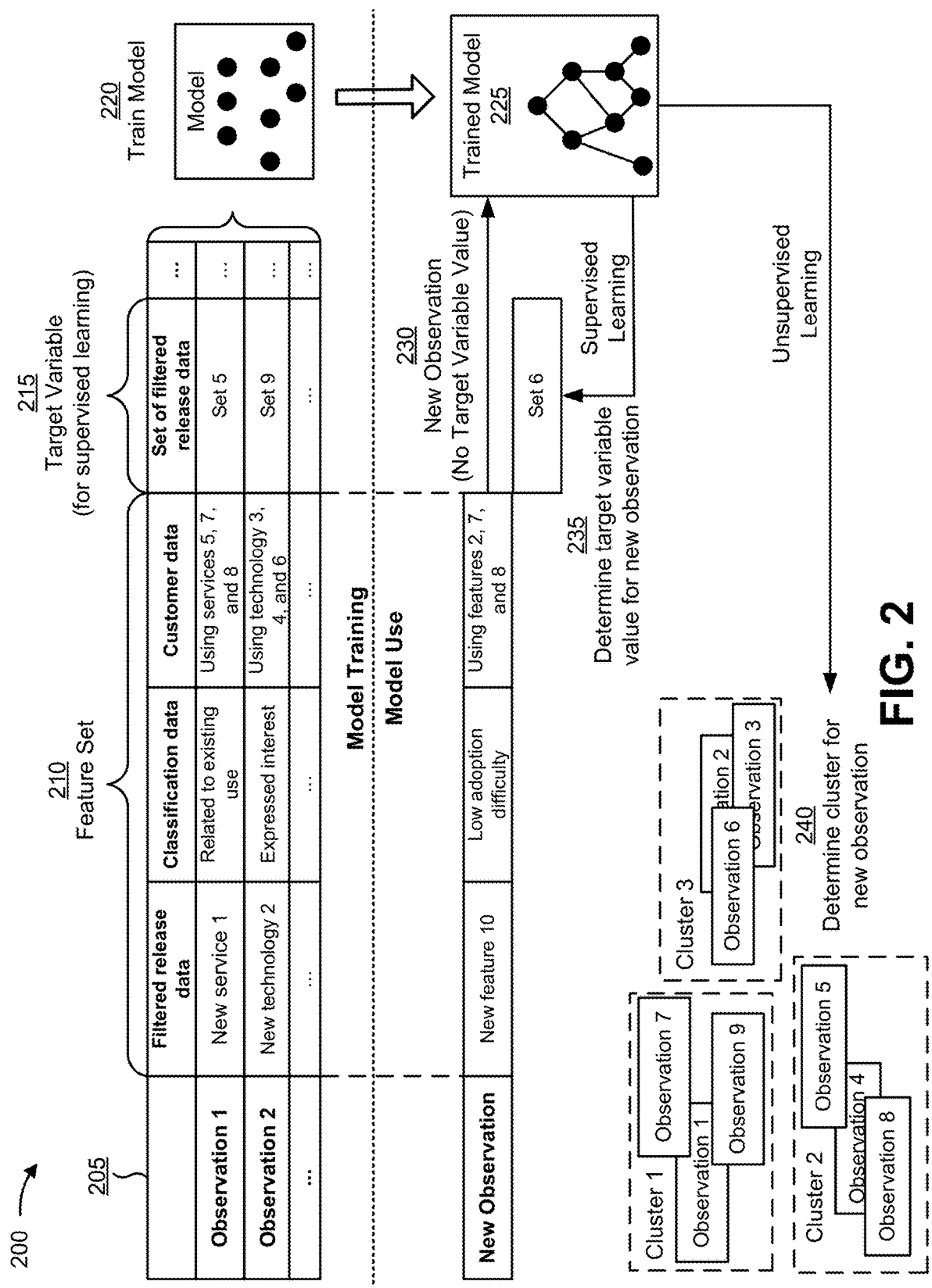
FIG. 2 is a diagram illustrating an example of training and using a machine learning model in connection with determining and recommending new releases from cloud providers to customers.

FIG. 2 is a diagram illustrating an example 200 of training and using a machine learning model in connection with determining and recommending new releases from cloud providers to customers. The machine learning model training and usage described herein may be performed using a machine learning system. The machine learning system may include or may be included in a computing device, a server, a cloud computing environment, and/or the like, such as the recommendation system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the recommendation system and/or the servers, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the recommendation system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of filtered release data, a second feature of classification data, a third feature of customer data, and so on. As shown, for a first observation, the first feature may have a value of new service 1, the second feature may have a value of related to existing use, the third feature may have a value of using services 5, 7, and 8, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is set of filtered release data, which has a value of set 5 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of new feature 10, a second feature of low adoption difficulty, a third feature of using features 2, 7, and 8, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of set 6 for the target variable of set of filtered release data for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, recommending a new release included in the set of filtered release data to a customer. The first automated action may include, for example, automatically implementing a new release included in the set of filtered release data for a customer.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a recommended new releases cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a not recommended new releases cluster), then the machine learning system may provide a second (e.g., different) recommendation (e.g., a recommendation to not implement the new release) and/or may perform or cause performance of a second (e.g., different) automated action, such as automatically preventing the new release from being implemented by a customer.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine and recommend new releases from cloud providers to customers. The machine learning system enables recognition and/or identification of tens, hundreds, thousands, or millions of features and/or feature values for tens, hundreds, thousands, or millions of observations, thereby increasing accuracy and consistency and reducing delay associated with determining and recommending new releases from cloud providers to customers relative to requiring computing resources to be allocated for tens, hundreds, or thousands of operators to manually determine and recommend new releases from cloud providers to customers using the features or feature values.

As indicated above, FIG. 2 is provided as an example. Other examples may differ from what is described in connection with FIG. 2.

Figure 3:
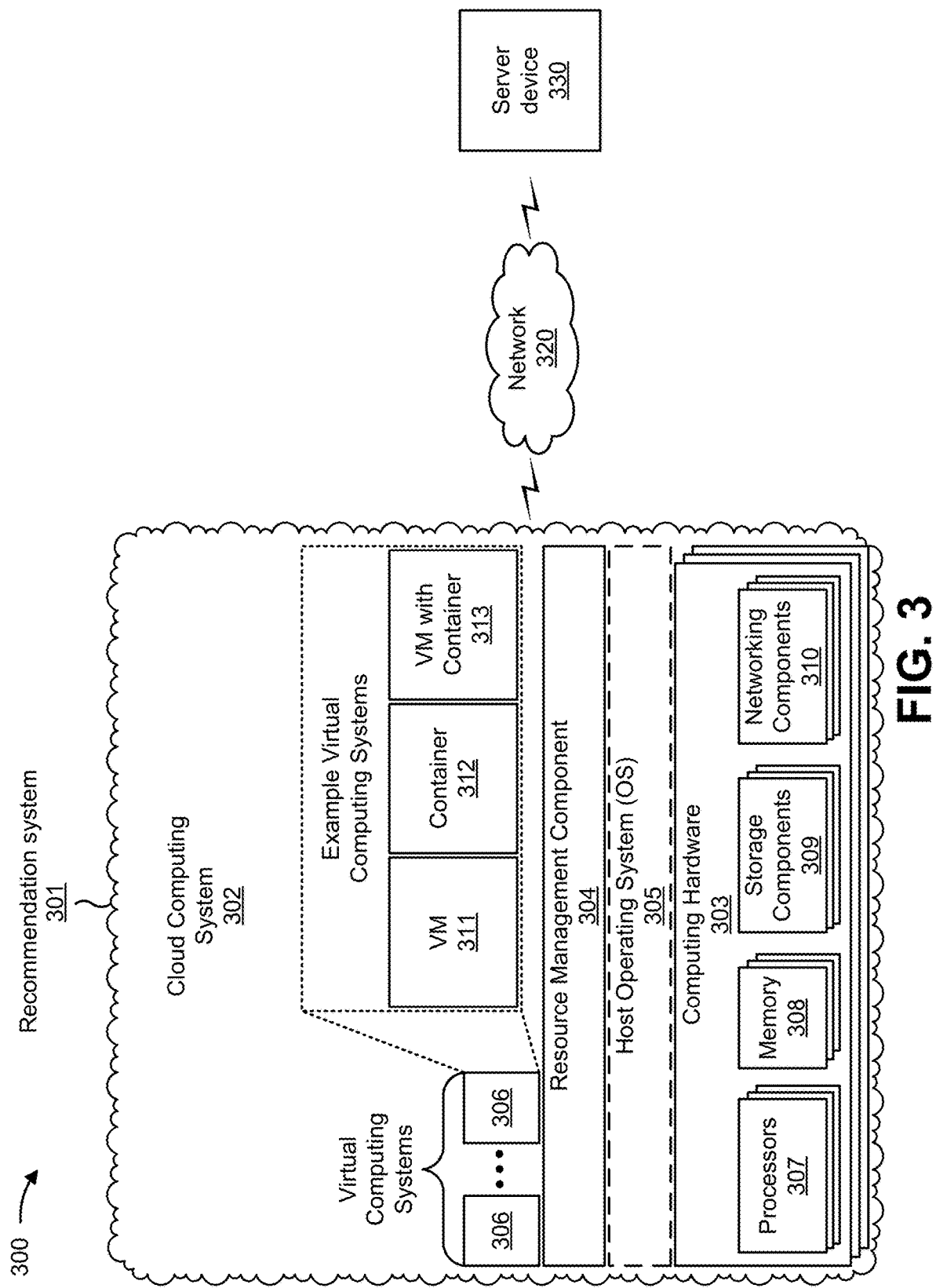
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a recommendation system 301, which may include one or more elements of and/or may execute within a cloud computing system 302. The cloud computing system 302 may include one or more elements 303-313, as described in more detail below. As further shown in FIG. 3, environment 300 may include a network 320 and/or a server device 330. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

In some implementations, the cloud computing system may include a serverless infrastructure. The serverless infrastructure may utilize a type of virtualization (e.g., a virtual machine, a container, and/or the like) that is transparent to, or hidden from, users of the cloud computing system.

Although the recommendation system 301 may include one or more elements 303-313 of the cloud computing system 302, may execute within the cloud computing system 302, and/or may be hosted within the cloud computing system 302, in some implementations, the recommendation system 301 may not be cloud-based (e.g., may be implemented outside of a cloud computing system) or may be partially cloud-based. For example, the recommendation system 301 may include one or more devices that are not part of the cloud computing system 302, such as device 400 of FIG. 4, which may include a standalone server or another type of computing device. The recommendation system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Server device 330 includes one or more devices capable of receiving, generating, storing, processing, providing, and/or routing information associated with determining and recommending new releases from cloud providers to customers, as described elsewhere herein. Server device 330 may include a communication device and/or a computing device. For example, server device 330 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. Server device 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
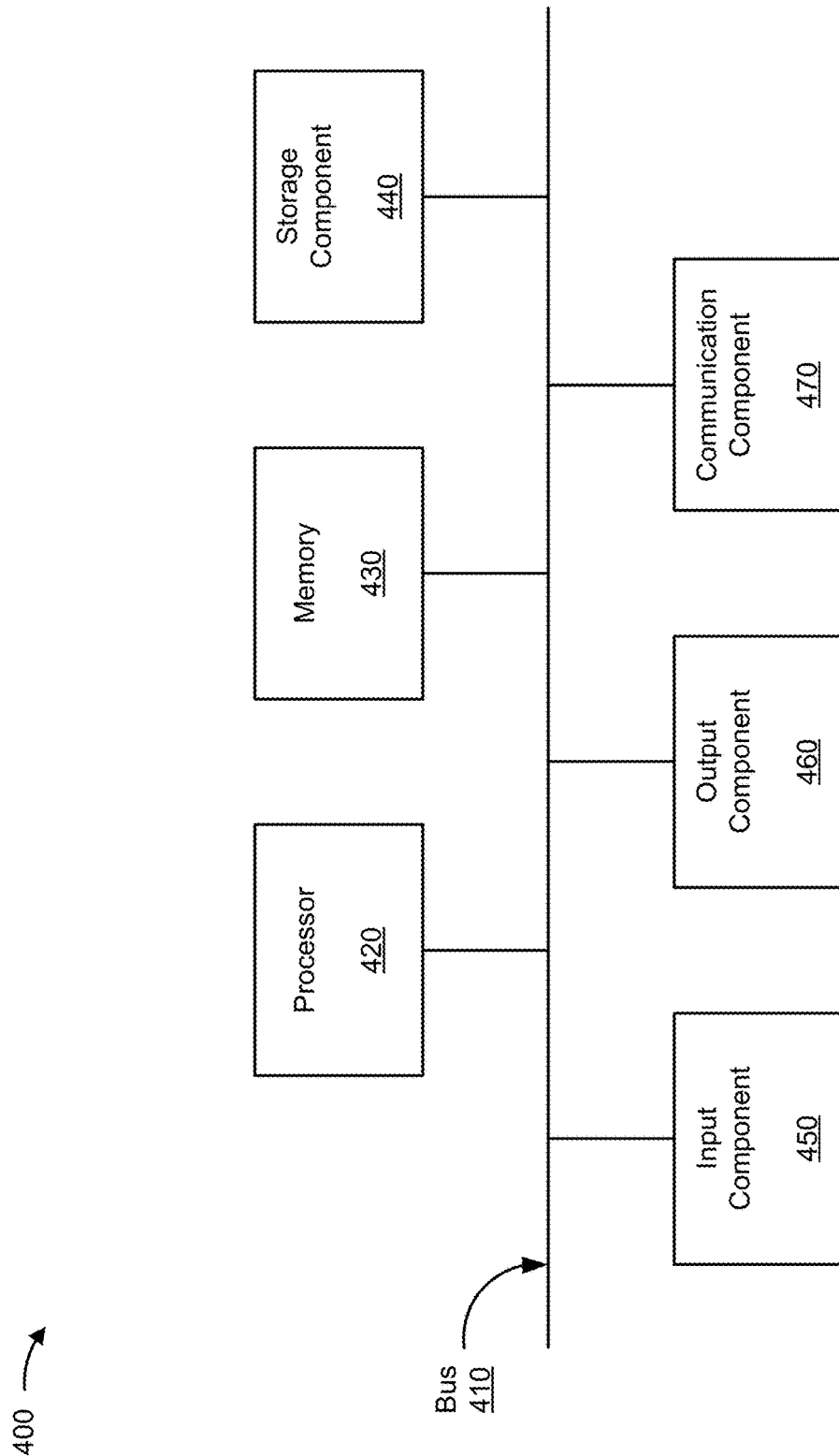
FIG. 4 is a diagram of example components of one or more devices of FIG. 3.

FIG. 4 is a diagram of example components of a device 400, which may correspond to recommendation system 301 and/or server device 330. In some implementations, recommendation system 301 and/or server device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
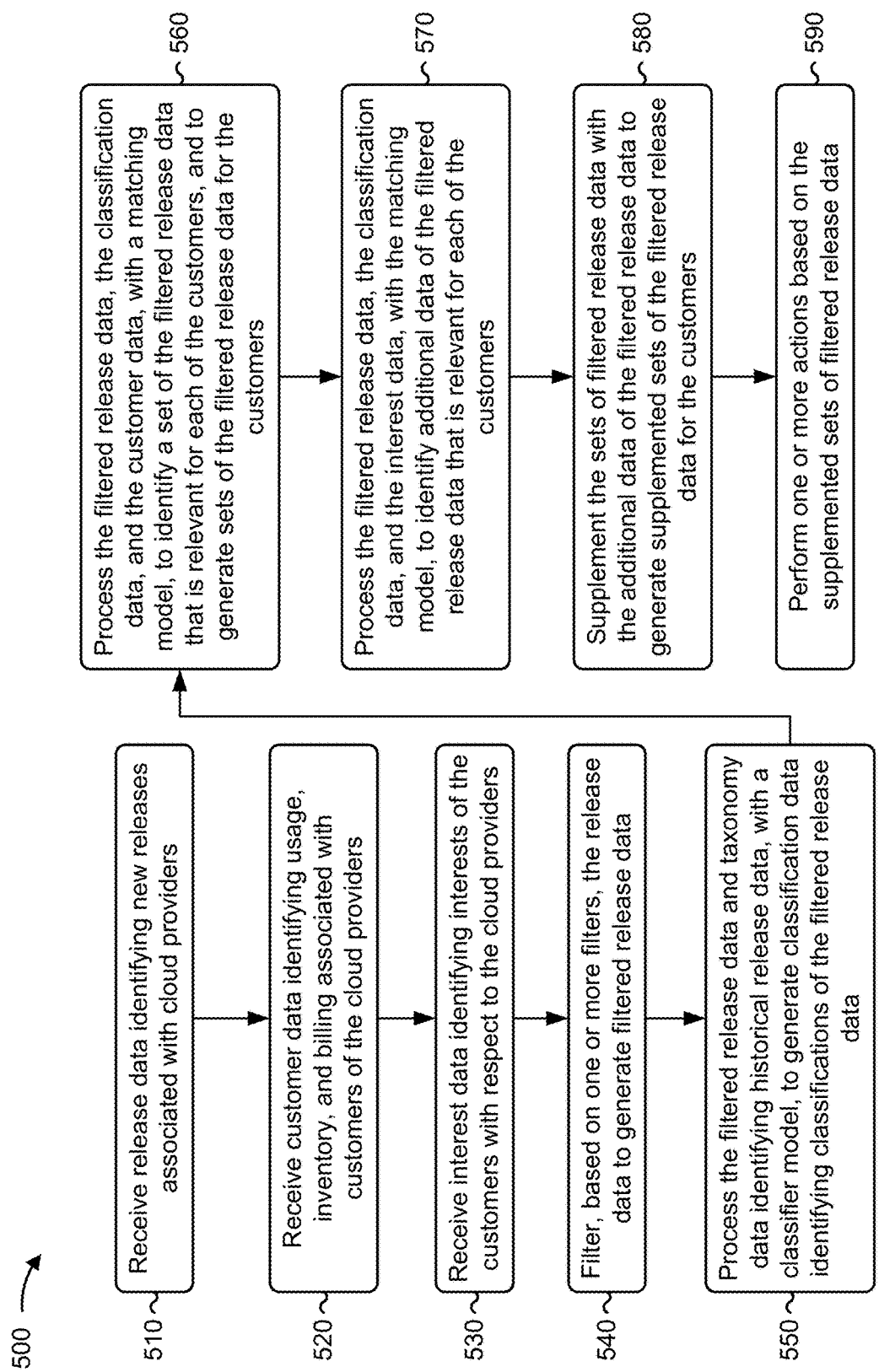
FIG. 5 is a flowchart of an example process relating to determining and recommending new releases from cloud providers to customers.

FIG. 5 is a flowchart of an example process 500 associated with utilizing machine learning models to determine and recommend new releases from cloud providers to customers. In some implementations, one or more process blocks of FIG. 5 may be performed by a device (e.g., recommendation system 301). In some implementations, one or more process blocks of FIG. 5 may be performed by another device or a group of devices separate from or including the device, such as a server device (e.g., server device 330). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving release data associated with cloud providers (block 510). For example, the device may receive release data associated with cloud providers, as described above. The release data may include information identifying new releases of services, technologies, features, regional access, and pricing models associated with cloud providers, removal of a service, a technology, a feature, regional access, and/or a pricing model by the cloud providers, an end of life of a service, a technology, a feature, regional access, and/or a pricing model associated with the cloud providers, an end of support of a service, a technology, a feature, regional access, and/or a pricing model associated with the cloud providers, and/or the like.

As further shown in FIG. 5, process 500 may include receiving customer data identifying usage, inventory, and billing associated with customers of the cloud providers (block 520). For example, the device may receive customer data identifying usage, inventory, and billing associated with customers of the cloud providers, as described above.

As further shown in FIG. 5, process 500 may include receiving interest data identifying interests of the customers with respect to the cloud providers (block 530). For example, the device may receive interest data identifying interests of the customers with respect to the cloud providers, as described above.

As further shown in FIG. 5, process 500 may include filtering, based on one or more filters, the release data to generate filtered release data (block 540). For example, the device may filter, based on one or more filters, the release data to generate filtered release data, as described above. The device may filter, from the release data, one or more of defect fixes, pre-release features, or beta releases, to generate the filtered release data.

As further shown in FIG. 5, process 500 may include processing the filtered release data and taxonomy data identifying historical release data, with a classifier model, to generate classification data identifying classifications of the filtered release data (block 550). For example, the device may process the filtered release data and taxonomy data identifying historical release data, with a classifier model, to generate classification data identifying classifications of the filtered release data, as described above. When processing the filtered release data and the taxonomy data identifying the historical release data, with the classifier model, to generate the classification data identifying the classifications of the filtered release data, the device may analyze the filtered release data, via natural language processing, to extract categories of the filtered release data; and may match the categories of the filtered release data and the taxonomy data to identify the classifications of the filtered release data.

The classifications of the filtered release data may include a new service, a service update, a removal of a service, a partial removal of a service, a new technology, a technology update, a removal of a technology, a partial removal of a technology, a new feature, a feature update, a removal of a feature, a partial removal of a feature, a new regional access, a regional access update, a removal or termination of a regional access, a partial removal or termination of a regional access, a new pricing model, a pricing model update, a removal of a pricing model, a partial removal of a pricing model, and/or the like. In some implementations, the device may update the taxonomy data with filtered release data that fails to match the taxonomy data.

As further shown in FIG. 5, process 500 may include processing the filtered release data, the classification data, and the customer data, with a matching model, to identify a set of the filtered release data that is relevant for each of the customers, and to generate sets of the filtered release data for the customers (block 560). For example, the device may process the filtered release data, the classification data, and the customer data, with a matching model, to identify a set of the filtered release data that is relevant for each of the customers, and to generate sets of the filtered release data for the customers, as described above. The matching model may comprise a string matching model, a heuristic model, a collaborative filtering model, a hierarchical clustering model, and/or a machine learning model.

In some implementations, when processing the filtered release data, the classification data, and the customer data, with the matching model, to identify the set of the filtered release data that is relevant for each of the customers, and to generate the sets of the filtered release data for the customers, the device may match the filtered release data and one or more of the usage, the inventory, or the billing associated with the customers, based on the classification data, to generate the sets of the filtered release data for the customers. Alternatively, and/or additionally, the device may rank the filtered release data based on one or more of the usage, the inventory, or the billing associated with the customers and based on the classification data; and may generate the sets of the filtered release data based on ranking the filtered release data.

In some implementations, when processing the filtered release data, the classification data, and the customer data, with the second model, to identify the set of the filtered release data that is relevant for each of the customers, and to generate the sets of the filtered release data for the customers, the device may determine impacts of the filtered release data on the customers; may rank the filtered release data based on the impacts and based on the classification data; and may generate the sets of the filtered release data based on ranking the filtered release data. The device may determine the impacts of the filtered release data on the customers based on an effort and/or an investment required to adopt a new release, whether a process for adopting a new release may be automatable, whether a new release may be automatically implemented by the device, and/or the like.

As further shown in FIG. 5, process 500 may include processing the filtered release data, the classification data, and the interest data, with the matching model, to identify additional data of the filtered release data that is relevant for each of the customers (block 570). For example, the device may process the filtered release data, the classification data, and the interest data, with the matching model, to identify additional data of the filtered release data that is relevant for each of the customers, as described above.

In some implementations, when processing the filtered release data, the classification data, and the interest data, with the matching model, to identify the additional data of the filtered release data that is relevant for each of the customers, the device may match the filtered release data and the interests of the customers in one or more of the services, the technologies, the features, the regional access, and the pricing models associated with the cloud providers, based on the classification data, to identify the additional data of the filtered release data that is relevant for each of the customers.

As further shown in FIG. 5, process 500 may include supplementing the sets of filtered release data with the additional data of the filtered release data to generate supplemented sets of the filtered release data for the customers (block 580). For example, the device may supplement the sets of filtered release data with the additional data of the filtered release data to generate supplemented sets of the filtered release data for the customers, as described above. In some implementations, the additional data includes information identifying the impacts of the filtered release data on the customers, such as information indicating an effort and/or an investment required to adopt a new release, information indicating whether a process for adopting a new release may be automatable, information indicating whether a new release may be automatically implemented by the device, and/or the like.

As further shown in FIG. 5, process 500 may include performing one or more actions based on the supplemented sets of filtered release data (block 590). For example, the device may perform one or more actions based on the supplemented sets of filtered release data, as described above. In some implementations, performing the one or more actions comprises one or more of providing, for display, a user interface that includes one of the supplemented sets of filtered release data, automatically implementing a particular new release in a particular supplemented set of filtered release data, of the supplemented sets of filtered release data, for a particular customer of the customers, or providing the supplemented sets of filtered release data to different customers, of the customers, at different time periods selected by the different customers.

Alternatively, and/or additionally, performing the one or more actions may comprise one or more of receiving, from a particular customer of the customers, feedback indicating whether the particular customer implemented a particular new release in a particular supplemented set of filtered release data of the supplemented sets of filtered release data, retraining at least one of the classifier model or the matching model based on the feedback indicating whether the particular customer, of the customers, implemented the particular new release in the particular supplemented set of filtered release data of the supplemented sets of filtered release data, or retraining at least one of the classifier model or the matching model based on the supplemented sets of filtered release data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, release data identifying new releases associated with cloud providers;
   receiving, by the device, customer data identifying usage, inventory, and billing associated with customers of the cloud providers;
   receiving, by the device, interest data identifying interests of the customers with respect to the cloud providers;
   filtering, by the device and based on one or more filters, the release data to generate filtered release data,
      wherein filtering the release data comprises:
         removing information identifying features to be released at a later date,
         executing a token-based natural language processing technique to identify a first set of features,
         executing an approximation-based natural language processing technique to identify a second set of features,
         filtering the first set of features and the second set of features to address conflicting values and determine identified features, and
         filtering the release data based on the identified features to generate the filtered release data;
   processing, by the device, the filtered release data and taxonomy data identifying historical release data, with a classifier model, to generate classification data,
      wherein processing the filtered release data and the taxonomy data comprises:
         determining a similarity score between a feature in the filtered release data and a historical feature included in the historical release data, and
         determining that the feature is associated with a particular classification, of classifications of the filtered release data, based on the similarity score satisfying a threshold;
   training, by the device, a matching model to identify a set of filtered release data,
      wherein training the matching model comprises:
         identifying a feature set based on performing natural language processing to extract a historical feature set from historical unstructured data,
            wherein performing the natural language processing comprises:
               executing the token-based natural language processing technique to identify a first set of historical features,
               executing the approximation-based natural language processing technique to identify a second set of historical features,
               assigning respective weights to features of the first set of historical features and the second set of historical features,
               determining the feature set based on using the respective weights to determine a weighted average, and
               training the matching model based on identifying the feature set;
   processing, by the device, the filtered release data, the classification data, and the customer data, with the matching model, to identify the set of the filtered release data that is relevant for each of the customers, and to generate sets of the filtered release data for the customers;
   processing, by the device, the filtered release data, the classification data, and the interest data, with the matching model, to identify additional data of the filtered release data that is relevant for each of the customers;
   supplementing, by the device, the sets of the filtered release data with the additional data of the filtered release data to generate supplemented sets of the filtered release data for the customers; and
   performing, by the device, one or more actions based on the supplemented sets of filtered release data.

2. The method of claim 1, wherein performing the one or more actions comprises one or more of:
   providing, for display, a user interface that includes one of the supplemented sets of filtered release data;
   automatically implementing a particular new release in a particular supplemented set of filtered release data, of the supplemented sets of filtered release data, for a particular customer of the customers; or providing the supplemented sets of filtered release data to different customers, of the customers, at different time periods selected by the different customers.

3. The method of claim 1, wherein performing the one or more actions comprises one or more of:
receiving, from a particular customer of the customers, feedback indicating whether the particular customer implemented a particular new release in a particular supplemented set of filtered release data of the supplemented sets of filtered release data;
retraining at least one of the classifier model or the matching model based on the feedback indicating whether the particular customer, of the customers, implemented the particular new release in the particular supplemented set of filtered release data of the supplemented sets of filtered release data; or
retraining at least one of the classifier model or the matching model based on the supplemented sets of filtered release data.

4. The method of claim 1, further comprising:
updating the taxonomy data with filtered release data that fails to match the taxonomy data.

5. The method of claim 1, wherein filtering, based on the one or more filters, the release data to generate the filtered release data comprises:
filtering, from the release data, one or more of defect fixes, pre-release features, or beta releases, to generate the filtered release data.

6. The method of claim 1, wherein processing the filtered release data and the taxonomy data identifying the historical release data, with the classifier model, to generate the classification data identifying the classifications of the filtered release data, comprises:
analyzing the filtered release data, via natural language processing, to extract categories of the filtered release data; and
matching the categories of the filtered release data and the taxonomy data to identify the classifications of the filtered release data.

7. The method of claim 1, wherein the classifications of the filtered release data include one or more of:
a new service,
a service update,
a removal of an existing service,
a partial removal of the existing service,
a new technology,
a technology update,
a removal of a technology,
a partial removal of the technology,
a new feature,
a feature update,
a removal of a feature,
a partial removal of the feature,
a new regional access,
a regional access update,
a removal of a regional access,
a partial removal of the regional access,
a new pricing model,
a pricing model update,
a removal of a pricing model, or
a partial removal of the pricing model.

8. A device, comprising:
one or more memories; and
one or more processors, communicatively coupled to the one or more memories, configured to:
receive release data identifying new releases associated with cloud providers;
receive customer data identifying usage, inventory, and billing associated with customers of the cloud providers;
receive interest data identifying interests of the customers with respect to the cloud providers;
filter, based on one or more filters, the release data to generate filtered release data,
wherein the one or more processors, to filter the release data, are configured to:
remove information identifying features to be released at a later date,
execute a token-based natural language processing technique to identify a first set of features,
execute an approximation-based natural language processing technique to identify a second set of features,
filter the first set of features and the second set of features to address conflicting values and determine identified features, and
filter the release data based on the identified features to generate the filtered release data;
process the filtered release data and taxonomy data identifying historical release data, with a first model, to generate classification data,
wherein the one or more processors, to process the filtered release data and the taxonomy data, are configured to:
determine a similarity score between a feature in the filtered release data and a historical feature included in the historical release data, and
determine that the feature is associated with a particular classification, of classifications of the filtered release data, based on the similarity score satisfying a threshold;
train a second model to identify a set of filtered release data,
wherein the one or more processors, to train the second model, are configured to:
identify a feature set based on performing natural language processing to extract a historical feature set from historical unstructured data,
wherein the one or more processors, to identify the feature set, are configured to:
execute the token-based natural language processing technique to identify a first set of historical features,
execute the approximation-based natural language processing technique to identify a second set of historical features,
assign respective weights to features of the first set of historical features and the second set of historical features,
determine the feature set based on using the respective weights to determine a weighted average, and
train the second model based on identifying the feature set;
process the filtered release data, the classification data, and the customer data, with the second model, to identify a set of the filtered release data that is relevant for each of the customers, and to generate sets of the filtered release data for the customers;
process the filtered release data, the classification data, and the interest data, with the second model, to identify additional data of the filtered release data that is relevant for each of the customers;

supplement the sets of the filtered release data with the additional data of the filtered release data to generate supplemented sets of the filtered release data for the customers; and perform one or more actions based on the supplemented sets of filtered release data.

9. The device of claim 8, wherein the one or more processors, when processing the filtered release data, the classification data, and the customer data, with the second model, to identify the set of the filtered release data that is relevant for each of the customers, and to generate the sets of the filtered release data for the customers, are configured to:

match the filtered release data and one or more of the usage, the inventory, or the billing associated with the customers, based on the classification data, to generate the sets of the filtered release data for the customers.

10. The device of claim 8, wherein the second model includes one or more of:

a string matching model,
a heuristic model,
a collaborative filtering model,
a hierarchical clustering model, or
a machine learning model.

11. The device of claim 8, wherein the one or more processors, when processing the filtered release data, the classification data, and the interest data, with the second model, to identify the additional data of the filtered release data that is relevant for each of the customers, are configured to:

match the filtered release data and the interests of the customers in one or more of services, technologies, features, regional access, and pricing models associated with the cloud providers, based on the classification data, to identify the additional data of the filtered release data that is relevant for each of the customers.

12. The device of claim 8, wherein the one or more processors, when processing the filtered release data, the classification data, and the customer data, with the second model, to identify the set of the filtered release data that is relevant for each of the customers, and to generate the sets of the filtered release data for the customers, are configured to:

rank the filtered release data based on one or more of the usage, the inventory, or the billing associated with the customers and based on the classification data; and
generate the sets of the filtered release data based on ranking the filtered release data.

13. The device of claim 8, wherein the one or more processors, when processing the filtered release data, the classification data, and the customer data, with the second model, to identify the set of the filtered release data that is relevant for each of the customers, and to generate the sets of the filtered release data for the customers, are configured to:

determine impacts of the filtered release data on the customers;
rank the filtered release data based on the impacts and based on the classification data; and
generate the sets of the filtered release data based on ranking the filtered release data.

14. The device of claim 8, wherein the one or more processors, when performing the one or more actions, are configured to:

receive feedback identifying one or more of:

a first new release, of the new releases, in the supplemented sets of filtered release data, that is implemented by the customers, or
a second new release, of the new releases, in the supplemented sets of filtered release data, that is not implemented by the customers; and retrain at least one of the first model or the second model based on the feedback.

15. A non-transitory computer-readable medium storing a set of instructions, the set of instructions comprising:

one or more instructions that, when executed by one or more processors of a device, cause the device to:

receive release data identifying new releases associated with cloud providers;
receive customer data identifying usage, inventory, and billing associated with customers of the cloud providers;
receive interest data identifying interests of the customers with respect to the cloud providers;
filter, based on one or more filters, the release data to generate filtered release data,
wherein the one or more instructions, that cause the one or more processors to filter the release data, cause the one or more processors to:
remove information identifying features to be released at a later date,
execute a token-based natural language processing technique to identify a first set of features,
execute an approximation-based natural language processing technique to identify a second set of features,
filter the first set of features and the second set of features to address conflicting values and determine identified features, and
filter the release data based on the identified features to generate the filtered release data;
process the filtered release data and taxonomy data identifying historical release data, with a classifier model, to generate classification data,
wherein the one or more instructions, that cause the one or more processors to process the filtered release data and the taxonomy data, cause the one or more processors to:
determine a similarity score between a feature in the filtered release data and a historical feature included in the historical release data, and
determine that the feature is associated with a particular classification, of classifications of the filtered release data, based on the similarity score satisfying a threshold;
train a matching model to identify a set of filtered release data,
wherein the one or more instructions, that cause the one or more processors to train the matching model, cause the one or more processors to:
identify a feature set based on performing natural language processing to extract a historical feature set from historical unstructured data,
wherein the one or more instructions, that cause the one or more processors to identify the feature set, cause the one or more processors to:
execute the token-based natural language processing technique to identify a first set of historical features,
execute the approximation-based natural language processing technique to identify a second set of historical features, assign respective weights to features of the first set of historical features and the second set of historical features, determine the feature set based on using the respective weights to determine a weighted average, and train the matching model based on identifying the feature set;

process the filtered release data, the classification data, and the customer data, with the matching model, to identify a set of the filtered release data that is relevant for each of the customers, and to generate sets of the filtered release data for the customers;

process the filtered release data, the classification data, and the interest data, with the matching model, to identify additional data of the filtered release data that is relevant for each of the customers;

supplement the sets of the filtered release data with the additional data of the filtered release data to generate supplemented sets of the filtered release data for the customers; and provide the supplemented sets of the filtered release data to server devices associated with the customers.

16. The non-transitory computer-readable medium of claim 15, wherein the one or more instructions further cause the device to one or more of:

provide, for display, a user interface that includes one of the supplemented sets of filtered release data;

automatically implement a particular new release in a particular supplemented set of filtered release data, of the supplemented sets of filtered release data, for a particular customer of the customers;

provide the supplemented sets of filtered release data to different customers, of the customers, at different time periods selected by the different customers;

receive, from a particular customer of the customers, feedback indicating whether the particular customer implemented a particular new release in a particular supplemented set of filtered release data of the supplemented sets of filtered release data;

retrain at least one of the classifier model or the matching model based on feedback indicating whether a particular customer, of the customers, implemented a particular new release in a particular supplemented set of filtered release data of the supplemented sets of filtered release data; or retrain at least one of the classifier model or the matching model based on the supplemented sets of filtered release data.

17. The non-transitory computer-readable medium of claim 15, wherein the one or more instructions, that cause the device to filter, based on the one or more filters, the release data to generate the filtered release data, cause the device to:

filter, from the release data, one or more of defect fixes, pre-release features, or beta releases, to generate the filtered release data.

18. The non-transitory computer-readable medium of claim 15, wherein the one or more instructions, that cause the device to process the filtered release data and the taxonomy data identifying the historical release data, with the classifier model, to generate the classification data identifying the classifications of the filtered release data, cause the device to:

analyze the filtered release data, via natural language processing, to extract categories of the filtered release data; and match the categories of the filtered release data and the taxonomy data to identify the classifications of the filtered release data.

19. The non-transitory computer-readable medium of claim 15, wherein the one or more instructions, that cause the device to process the filtered release data, the classification data, and the customer data, with the matching model, to identify the set of the filtered release data that is relevant for each of the customers, and to generate the sets of the filtered release data for the customers, cause the device to:

match the filtered release data and one or more of the usage, the inventory, or the billing associated with the customers, based on the classification data, to generate the sets of the filtered release data for the customers.

20. The non-transitory computer-readable medium of claim 15, wherein the one or more instructions, that cause the device to process the filtered release data, the classification data, and the interest data, with the matching model, to identify the additional data of the filtered release data that is relevant for each of the customers, cause the device to:

match the filtered release data and the interests of the customers in one or more of services, technologies, features, regional access, and pricing models associated with the cloud providers, based on the classification data, to identify the additional data of the filtered release data that is relevant for each of the customers.

* * * * *